(12) United States Patent
Bhagwat

(10) Patent No.: US 10,587,424 B1
(45) Date of Patent: Mar. 10, 2020

(54) POWER OVER DATA LINES SYSTEM USING POWER SUPPLY COUPLED TO END OF WINDING OF ISOLATION TRANSFORMER

(71) Applicant: Linear Technology Holding LLC, Wilmington, DE (US)

(72) Inventor: Gitesh Bhagwat, Santa Barbara, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 16/433,670

(22) Filed: Jun. 6, 2019

Related U.S. Application Data

(60) Provisional application No. 62/750,998, filed on Oct. 26, 2018.

(51) Int. Cl.
*H04L 12/10* (2006.01)
*H01F 27/28* (2006.01)
*H02J 1/00* (2006.01)

(52) U.S. Cl.
CPC ............. *H04L 12/10* (2013.01); *H01F 27/28* (2013.01); *H02J 1/00* (2013.01)

(58) Field of Classification Search
CPC ........... H04B 3/548; H04B 3/56; H04L 25/02; H04L 25/026; H04L 25/0272
See application file for complete search history.

(56) References Cited

U.S. PATENT DOCUMENTS

| 5,148,144 A * | 9/1992 | Sutterlin ................ H04B 3/548 455/402 |
| 2015/0145324 A1* | 5/2015 | Heath .................... H04B 3/56 307/1 |

* cited by examiner

*Primary Examiner* — Kevin Kim
(74) *Attorney, Agent, or Firm* — Patent Law Group; Brian D. Ogonowsky

(57) ABSTRACT

In a PoDL system, a PHY has its I/O terminals coupled to a wire pair via a galvanic isolation transformer and a CMC. Thus, DC power and common mode noise are blocked from the PHY inputs. One end of the secondary winding of the transformer is directly coupled to one winding of the CMC. A DC power supply has its positive voltage terminal directly coupled to the other end of the secondary winding and has its other output terminal (e.g., ground) directly coupled to the other winding of the CMC. An AC-coupling capacitor is coupled between the two outputs of the power supply. Differential signals are applied across the secondary winding to couple the differential signals to the PHY, while the secondary winding conducts the DC voltage to one of the wires (via the CMC), and the ground is coupled to the other one of the wires (via the CMC).

21 Claims, 6 Drawing Sheets

POWER OVER DATA LINES SYSTEM USING POWER SUPPLY COUPLED TO END OF WINDING OF ISOLATION TRANSFORMER

CROSS-REFERENCE TO RELATED APPLICATIONS

This application is based on and claims priority from U.S. Provisional Application Ser. No. 62/750,998, filed Oct. 26, 2018, by Gitesh Bhagwat, incorporated herein by reference.

FIELD OF THE INVENTION

The invention relates to Power over Data Lines (PoDL) systems, where DC power and data signals are provided over the same twisted wire pair or over a shielded cable, and, in particular, to techniques for coupling DC power to the conductors while isolating the DC power from the PHY.

BACKGROUND

FIG. 1 is an example of one type of PoDL system to which the present invention will be compared.

A PHY 10 outputs differential data and receives differential data via a conventional Media Dependent Interface (MDI) connector 12 coupled to wires 14 and 16 of a twisted wire pair. A conventional powered device (PD) is coupled to the other end of the wires 14/16. The PHY 10 represents the physical layer in the OSI model (Open Systems Interconnection model) and is a transceiver that typically includes signal conditioning and decoding circuitry for presenting bits to the next stage. The term PHY is a term of art and is defined by various IEEE standards, depending on the particular application. The PHY 10 is typically an integrated circuit. A digital processor (not shown) is coupled to the PHY 10 for processing the data.

The PHY 10 is connected to the MDI connector 12 via a common mode choke (CMC) 18, AC coupling capacitors C1 and C2, and a galvanic isolation transformer 20. The polarities of the windings are designated by the dots.

The CMC 18 is an in-line transformer with two windings, where each winding is in series with a wire in the twisted wire pair. As shown by the dots on the CMC 18 windings, the windings have the same polarity, so the magnetic fields generated by a differential mode signal are substantially cancelled out. Thus, the CMC 18 presents little inductance or impedance to differential-mode currents. Common mode currents, such as ambient noise in the wire pair, however, see a high impedance due to the combined inductances of the windings.

The CMC 18 ideally eliminates or greatly attenuates common mode RF noise while providing no loss for the differential or DC voltage signals.

The transformer 20 provides added DC isolation and common mode noise attenuation for the PHY 10. The secondary winding may be center tapped to provide a ground reference.

Therefore, there is little attenuation of differential mode signals between the PHY 10 and the wires 14 and 16, while there is very high attenuation of common mode noise and DC power between the PHY 10 and the wires 14 and 16.

A differential mode choke (DMC) 22 is coupled between the MDI connector 12 and a DC power supply 24. The power supply 24 has a low output impedance as is characteristic of a voltage source. The DMC 22 has windings with opposite polarities (dots on opposite ends). The DMC 22 presents a high impedance to AC differential mode signals while it shunts the common mode signals to the power supply 24 due to its low impedance to common mode signals. Therefore, the combination of the CMC 18 and the DMC 22 can substantially remove AC common mode noise that has been coupled to the wire pair.

A termination circuit 25 comprises resistors R1 and R2 and capacitors C3 and C4 coupled to the wires 14 and 16, via the MDI connector 12, to eliminate reflections of the common mode noise on the twisted wire pair. The termination circuit 25 is generally designed to match the common mode impedance of the wire pair to minimize common mode reflectance.

Although the circuit of FIG. 1 works well, it requires three relatively expensive and large components: transformer 20, CMC 18, and DMC 22. Further, if these components have mismatched windings, mode conversion may occur, leading to data errors. The two AC-coupling capacitors C1 and C2 also add size and expense.

What is needed is a PoDL circuit that uses fewer components than the circuit of FIG. 1, so is potentially smaller and less expensive, while achieving a similar level of galvanic isolation and common mode noise attenuation with high DC power coupling efficiency.

SUMMARY

In one embodiment of a PoDL system, a PHY has its input/output (I/O) terminals coupled to a wire pair via an isolation transformer and a CMC. The I/O terminals are directly coupled across the primary winding of the transformer. Thus, DC power and common mode noise are blocked from the PHY inputs.

One end of the secondary winding of the transformer is directly coupled to one winding of the CMC. A DC power supply has one output terminal (e.g., a positive voltage) directly coupled to the other end of the secondary winding and has its other output terminal (e.g., ground) directly coupled to the other winding of the CMC. An AC-coupling capacitor is coupled between the two outputs of the power supply, so that the capacitor passes differential signals.

Therefore, the differential signals from the wire pair are applied across the secondary winding of the transformer to couple the differential signals to the PHY via the primary winding.

The secondary winding conducts the positive DC voltage to one of the wires (via the CMC), and the ground is coupled to the other one of the wires (via the CMC). Therefore, the wires are DC-coupled to the power supply, while the DC power is blocked from the PHY by the transformer.

In another embodiment, the CMC is eliminated since the transformer blocks common mode noise.

Therefore, only one or two coupling components are needed in the PoDL circuit, compared to the five coupling components in FIG. 1, greatly reducing size and cost.

Other benefits and embodiments are described

BRIEF DESCRIPTION OF THE DRAWINGS

Elements that are the same or equivalent in the various figures are labelled with the same numerals.

DETAILED DESCRIPTION OF THE EMBODIMENTS

Figure 1:
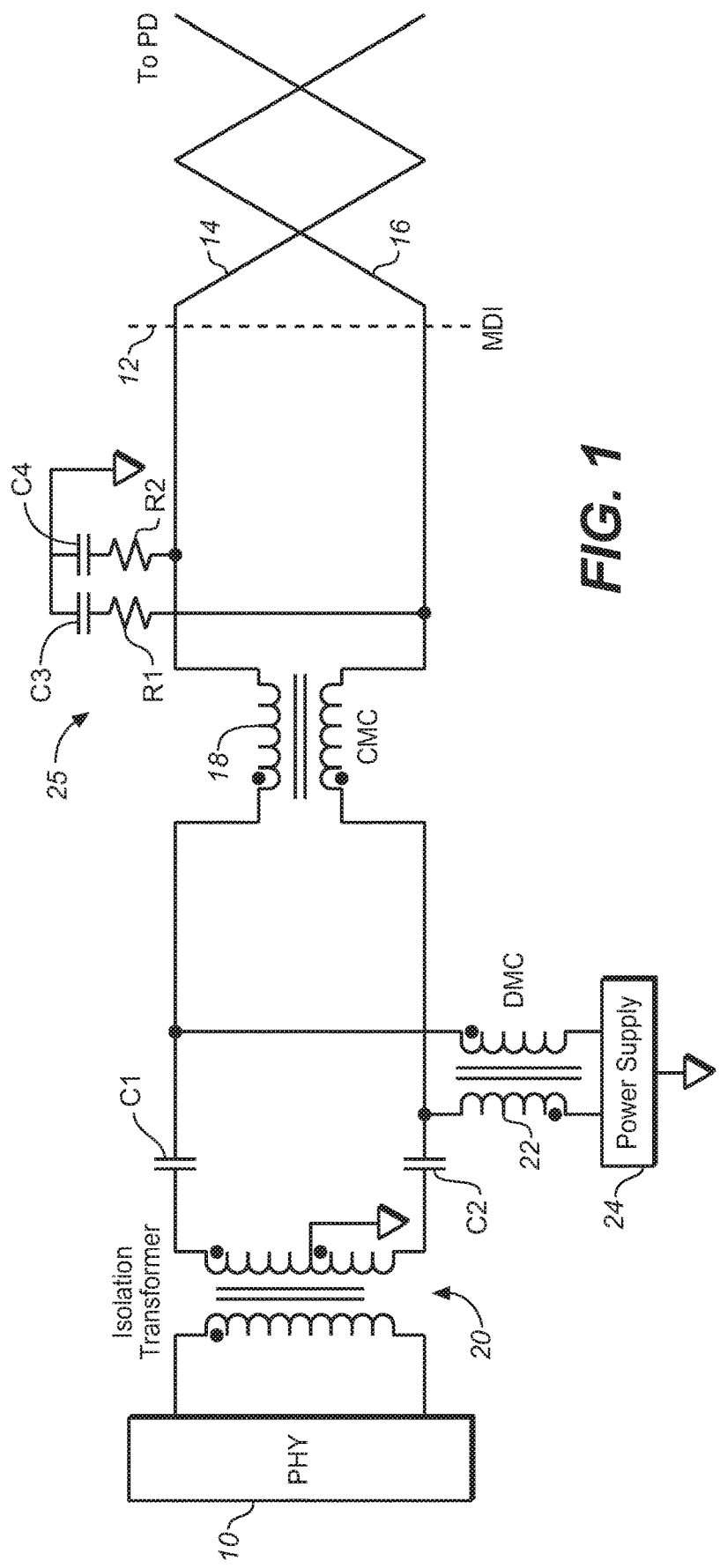
FIG. 1 illustrates a PoDL circuit that uses five components to couple differential signals to the PHY and couple DC power to the wires.
Figure 2:
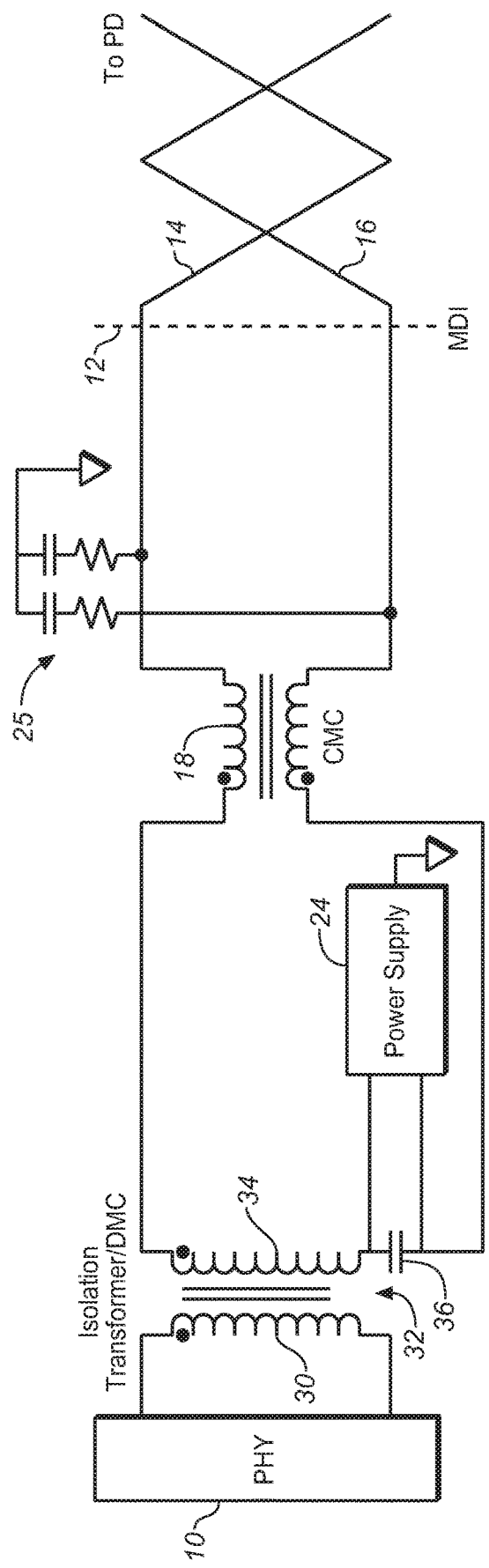
FIG. 2 illustrates one embodiment of the invention where the power supply is directly coupled to one end of the transformer's secondary winding and directly coupled to one input of a first CMC.

FIG. 2 illustrates an embodiment of the invention where DC power is coupled to the wires 14 and 16 in a twisted wire pair, and only Ethernet differential signals are transmitted and received by the PHY 10 (a transceiver). Common mode noise is greatly attenuated by the CMC 18. The termination circuit 25, designed to prevent common mode reflections, may be similar to the termination circuit 25 in FIG. 1.

The PHY 10 has I/O terminals coupled across a primary winding 30 of a galvanic isolation transformer 32. One end of the secondary winding 34 is directly coupled to one winding of the CMC 18, and the other end is directly coupled to one output terminal of the DC power supply 24. It will be assumed that the output is a positive voltage output of the power supply 24. The other output terminal of the power supply 24, which may be ground or another reference voltage, is directly coupled to the other winding of the CMC 18.

An AC-coupling capacitor 36 is coupled across the power supply 24 output terminals for conducting AC signals. The capacitor 36 also serves to filter the power supply 24 voltage.

Differential AC signals are coupled between the wire pair and the PHY 10 via the CMC 18, the capacitor 36, and the transformer 32. The CMC 18 blocks common mode noise, and common mode signals are also blocked by the transformer 32.

The DC voltage is conducted by the secondary winding 34 and the CMC 18 to the wire 14, and the reference voltage is coupled to the wire 16 via the CMC 18. In that regard, the secondary winding of the transformer 34 also performs the function of a DMC that couples DC voltage.

The CMC 18 is optional since the transformer 34 already blocks the transmission of common mode signals.

If the CMC 18 were excluded, the functions of DC coupling and differential coupling to/from the wires 14/16 are accomplished with a single transformer 32 and the capacitor 36. Since there is no CMC or DMC, there is a reduction in any mode conversion due to mismatched windings. The size and cost of the PoDL circuit of FIG. 2 is greatly reduced compared to the PoDL circuit of FIG. 1 with a reduction in mode conversion.

Instead of the balanced wire pair, a coaxial cable may be used.

Figure 3:
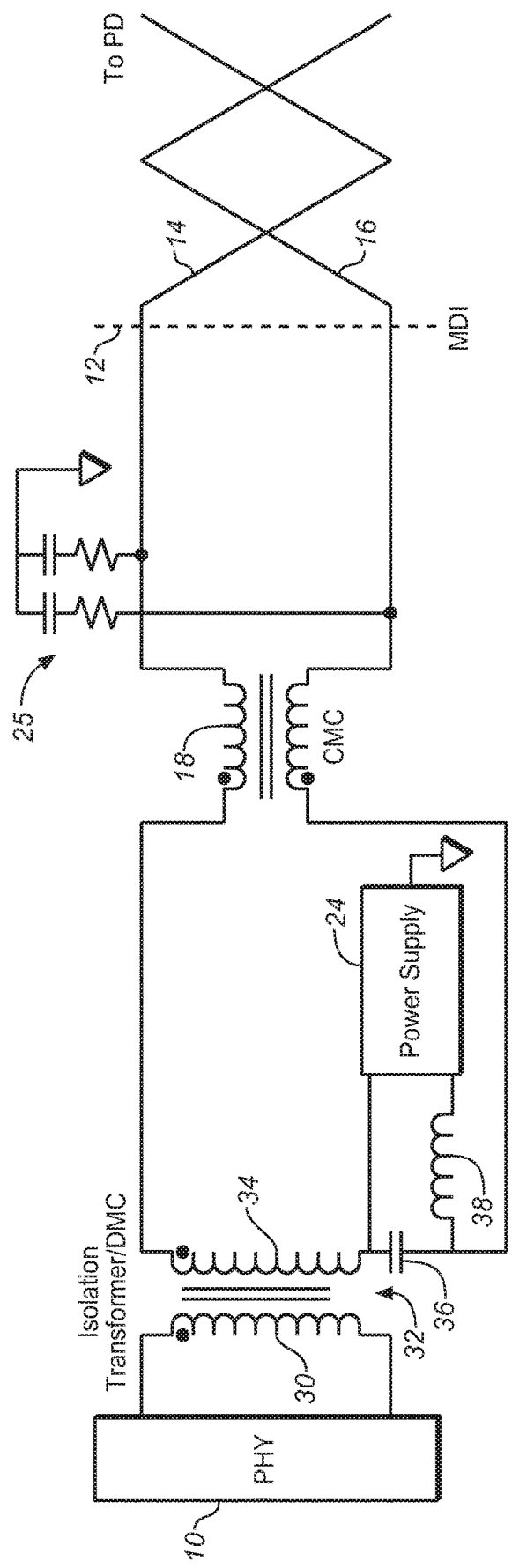
FIG. 3 illustrates another embodiment of the invention where the power supply is directly coupled to one end of the transformer's secondary winding and coupled to the CMC via an inductor.
Figure 4:
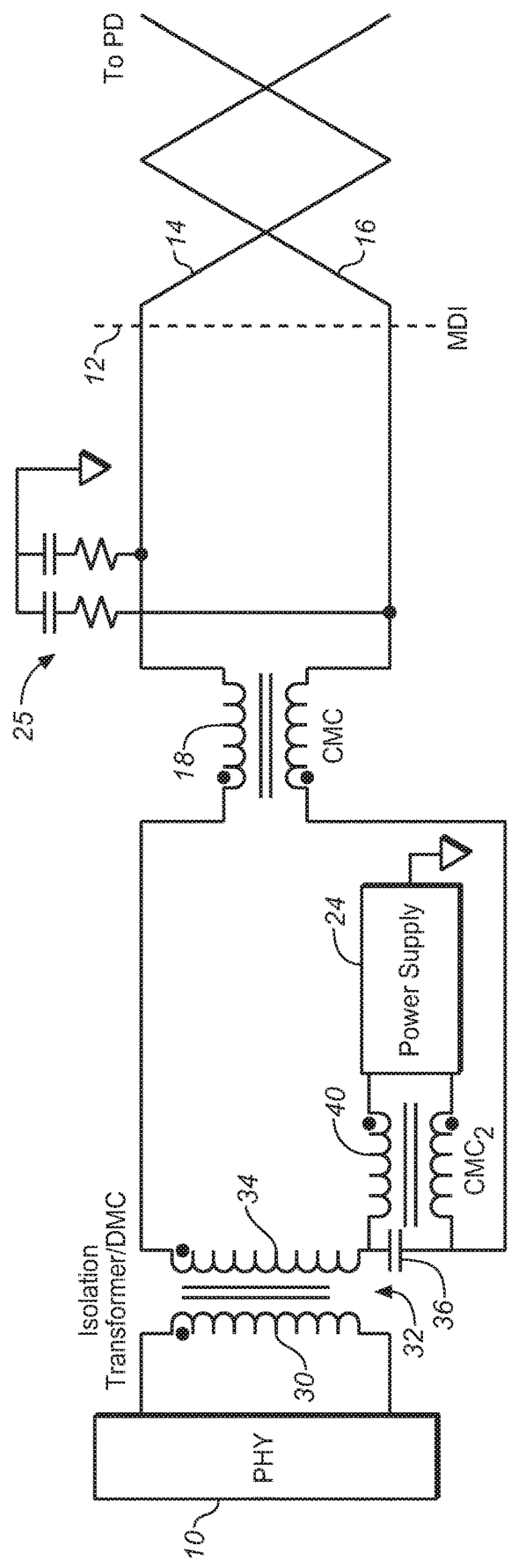
FIG. 4 illustrates another embodiment of the invention where the power supply is coupled to the transformer's secondary winding via a second CMC and coupled to the first CMC via the second CMC.

For AC ground isolation, the power supply 24 may be connected via an inductor or another CMC, as shown in FIGS. 3 and 4.

In FIG. 3, an inductor 38 passes DC voltage but blocks AC signals. Assuming that the ground terminal is coupled to the inductor 38, any AC perturbations in the ground signal are blocked by the inductor 38. Another inductor (not shown) may be connected between the positive output of the power supply 24 and the secondary winding 34 to improve the balance.

In FIG. 4, a CMC 40 introduces an impedance between the power supply's ground (bottom power supply terminal) and the "bottom" data signal, thereby preserving the differential nature of the signals.

In FIGS. 3 and 4, the inductance of the CMC 40 or inductor 38 creates a high impedance for AC signals, so even though the power supply 24 may have a low output impedance (typical of a voltage source), there will be insignificant attenuation of the data signal.

In all embodiments, the twisted wire pair may be replaced with a coaxial cable.

Figure 5:
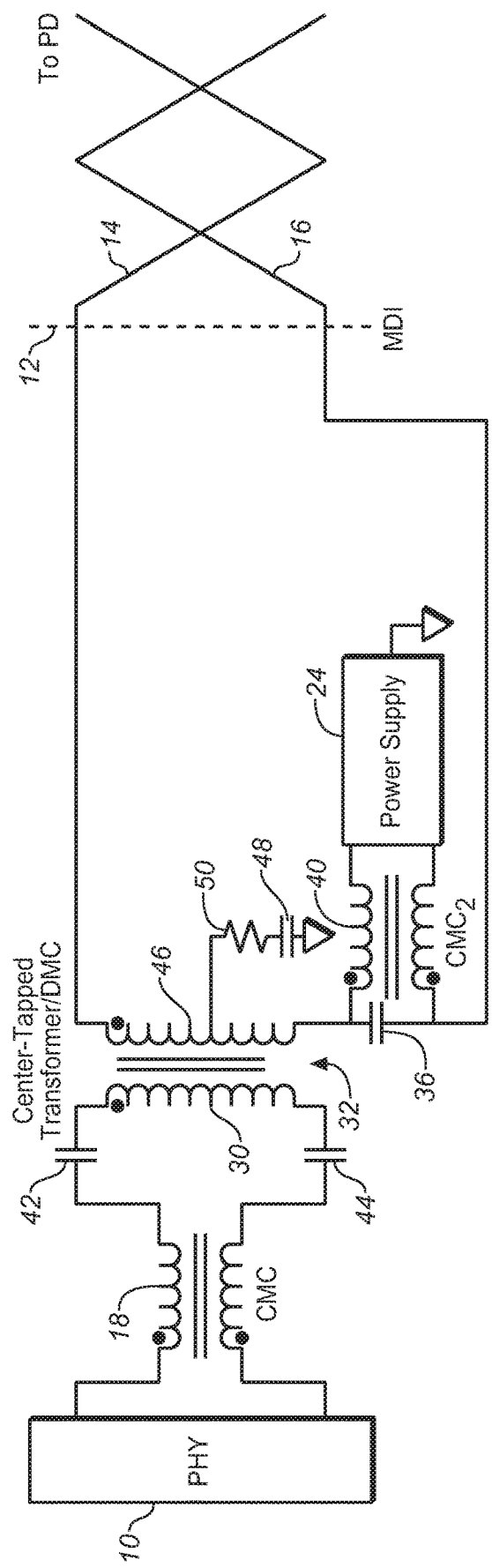
FIG. 5 is similar to FIG. 4 except the first CMC is moved to the PHY side of the transformer, and the secondary winding of the transformer has a center tap coupled to ground via an AC-coupling capacitor and a resistor.

In FIG. 5 the CMC 18 is moved to the PHY side of the transformer 32 so DC power does not flow through the CMC 18. This eases the current requirements of the CMC 18, resulting in lower cost. Optional AC-coupling capacitors 42 and 44 are connected to the PHY side of the transformer 32 to block DC signals.

The secondary winding 46 has a center tap coupled to ground via an AC-coupling capacitor 48 and resistor 50. This provides a termination for common mode signals.

Figure 6:
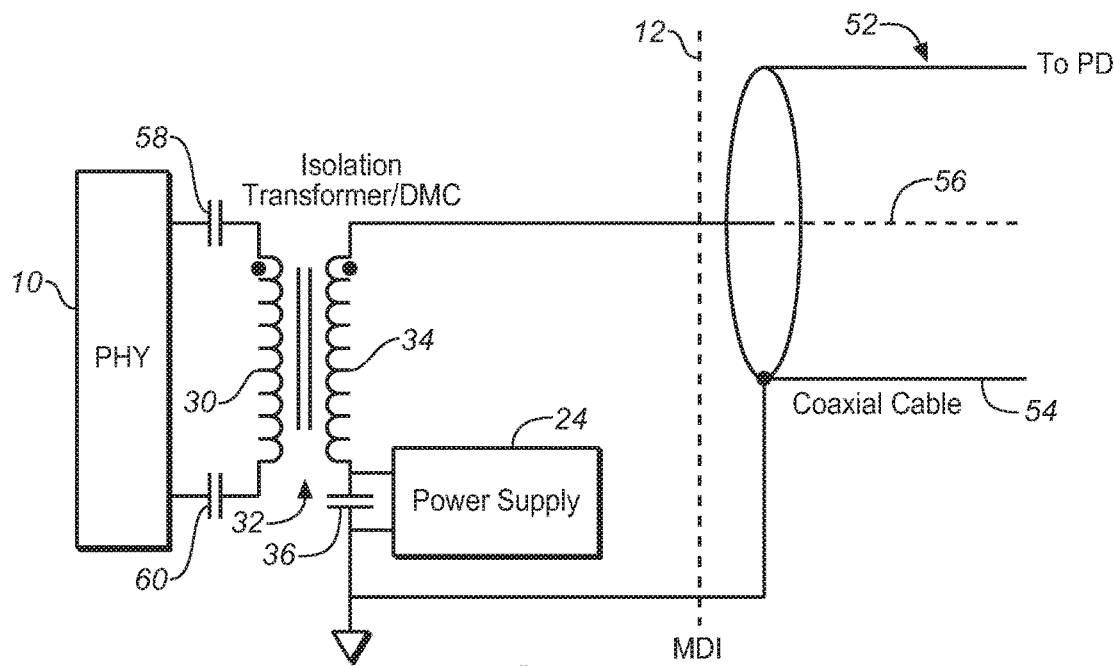
FIG. 6 illustrates another embodiment of the invention using a coaxial cable, where the PHY signals are differential mode and the coaxial cable signals are single-ended mode.

FIG. 6 illustrates the use of the PoDL circuit with a coaxial cable 52. The conductive shield 54 is coupled to ground, and the center conductor 56 is directly coupled to the end of the secondary winding 34. Optional AC-coupling capacitors 58 and 60 are coupled to the I/O terminals of the PHY 10. In this embodiment, the transformer 32 performs the function of both a Balun (balanced to unbalance transformation) and a DC coupling inductor. Therefore, the PHY 10 operates in the differential domain, while the signal on the coaxial cable 52 is in the single-ended domain. No termination circuitry for preventing common mode reflections is needed since the signals are unbalanced.

Figure 7:
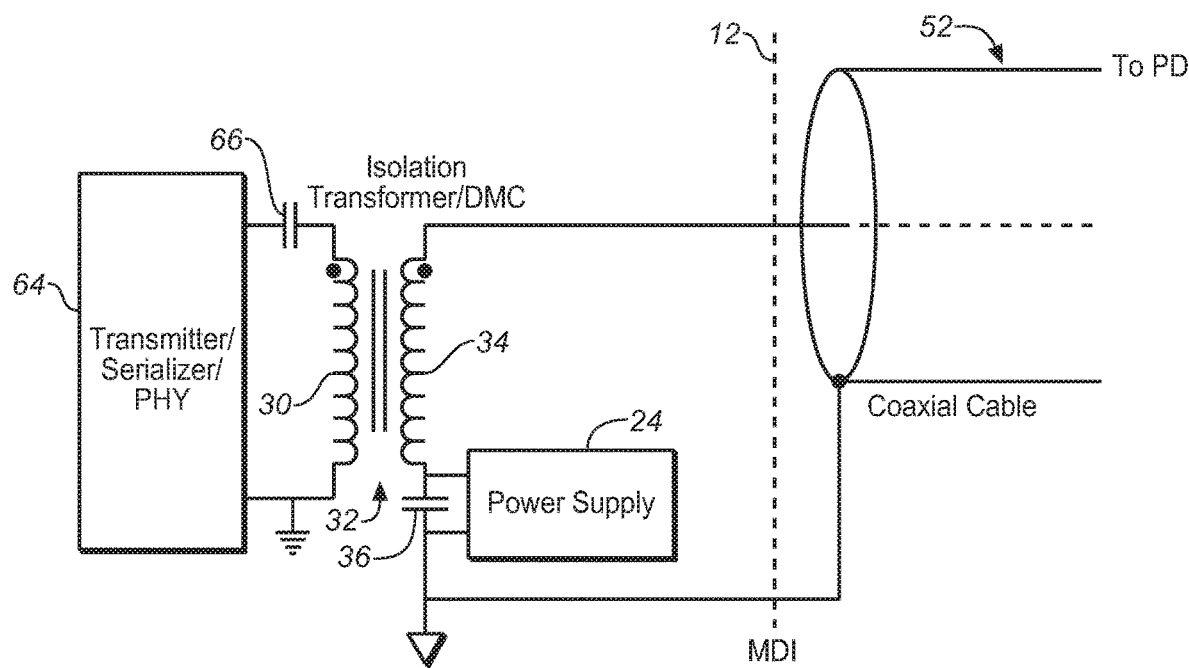
FIG. 7 illustrates another embodiment of the invention where an output of the PHY is grounded (single-ended mode) and a coaxial cable is used.

FIG. 7 illustrates a variation of FIG. 6 where the output of the PHY 62 is unbalanced (single-ended), with one output being a ground reference. An optional AC-coupling capacitor 66 couples the other I/O terminal to the transformer 32.

In both FIGS. 6 and 7, if the output impedance of the PHY 10/64, in conjunction with the impedance of transformer 32, is not matched to the impedance of the coaxial cable 52 (typically 75 ohms), the impedance can be altered by altering the turns ratio in the transformer 32. Matching impedances prevents reflections and more efficiently couples power.

As described, the various embodiments: 1) couple both DC power and data signals to the wire pair or coaxial cable while attenuating common mode noise; 2) integrate functionalities into fewer components to reduce cost, size, and mode conversion; 3) provide galvanic isolation of the PHY which offers increased robustness and resilience to electrical stresses, such as surges; 4) converts single-ended signals (FIG. 6) to differential signals and vice versa; and 5) impedance transformation can be achieve by altering the turns ratio in the transformer, which is important for applications where the coaxial cable impedance (typically 75 ohms) is different from the output impedance of the transceiver (PHY).

Although only the power injecting side of the PoDL system is shown in the figures, the differential data path of the PD side may be identical to that shown in the power injecting side for attenuating AC common mode noise and minimizing reflections. Any type of DC de-coupling circuit can be used in the PD for de-coupling DC power from the conductors to power a PD load. The PD may be conventional.

Any combinations of the features of the various figures may be combined to realize the various advantages described herein.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power over Data Lines (PoDL) circuit for connection to a first conductor and a second conductor comprising:
    a transceiver having a first terminal and a second terminal, the transceiver for transmitting data signals over the first conductor and the second conductor and receiving data signals from the first conductor and the second conductor;
    an isolation transformer having a primary winding and a secondary winding, the first terminal and the second terminal of the transceiver being coupled across the primary winding;
    a DC power supply having a first output terminal and a second output terminal;
    the secondary winding of the transformer having a first end coupled to the first conductor, and having a second end coupled to the first output terminal of the DC power supply;
    the second output terminal of the power supply being coupled to the second conductor; and
    an AC-coupling first capacitor coupled between a second end of the secondary winding of the transformer and the second conductor for coupling data signals across the secondary winding,
    wherein DC power is conducted through the secondary winding and through the first conductor and the second conductor, and the data signals are also conducted through the secondary winding, via the first capacitor, and through the first conductor and the second conductor.

2. The PoDL circuit of claim 1 wherein the first output terminal of the power supply is directly connected to the first end of the secondary winding.

3. The PoDL circuit of claim 1 wherein the second output terminal of the power supply is directly connected to the second conductor.

4. The PoDL circuit of claim 1 further comprising a common mode choke (CMC) having a first winding coupled between the first conductor and the first end of the secondary winding of the transformer, and having a second winding coupled between the second conductor and the first capacitor.

5. The PoDL circuit of claim 1 further comprising a first inductor coupled between the second output terminal of the power supply and the first capacitor.

6. The PoDL circuit of claim 1 further comprising a common mode choke (CMC) having a first winding coupled between the first output terminal of the power supply and the second end of the secondary winding of the transformer, and having a second winding coupled between the second conductor and the second output terminal of the power supply.

7. The PoDL circuit of claim 1 further comprising a common mode choke (CMC) coupled between the primary winding of the transformer and the transceiver.

8. The PoDL circuit of claim 7 further comprising AC-coupling second capacitors coupled between the primary winding and the CMC.

9. The PoDL circuit of claim 1 wherein the secondary winding of the transformer has a center tap coupled to ground.

10. The PoDL of claim 1 further comprising AC-coupling second capacitors coupled between the transceiver and the first conductor and the second conductor to block DC signals.

11. The PoDL circuit of claim 1 wherein the first conductor and the second conductor comprise a twisted wire pair, and the data signals are differential data signals.

12. The PoDL circuit of claim 1 wherein the first conductor and the second conductor comprise a coaxial cable, and the data signals are single-ended signals.

13. The PoDL circuit of claim 12 wherein the second output terminal of the power supply is coupled to a shield conductor of the coaxial cable.

14. The PoDL circuit of claim 13 wherein the second terminal of the transceiver is coupled to ground so that the transceiver inputs and outputs single-ended data signals.

15. The PoDL circuit of claim 1 further comprising a Media Dependent Interface (MDI) coupled to the first conductor and the second conductor.

16. The PoDL circuit of claim 1 wherein the transceiver is a PHY in a physical layer in the Open Systems Interconnection (OSI) model.

17. A method performed by a Power over Data Lines (PoDL) circuit connected to a first conductor and a second conductor comprising:
    transmitting and receiving data signals, by a transceiver having a first terminal and a second terminal, over the first conductor and the second conductor;
    coupling the data signals to and from the transceiver via an isolation transformer having a primary winding and a secondary winding, the first terminal and the second terminal of the transceiver being coupled across the primary winding;
    supplying DC power to the first conductor and the second conductor via a DC power supply having a first output terminal and a second output terminal,
    the secondary winding of the transformer having a first end coupled to the first conductor, and having a second end coupled to the first output terminal of the DC power supply,
    the second output terminal of the power supply being coupled to the second conductor; and
    coupling the data signals across the secondary winding via an AC-coupling first capacitor coupled between a second end of the secondary winding of the transformer and the second conductor for coupling data signals across the secondary winding,
    wherein DC power is conducted through the secondary winding and through the first conductor and the second conductor, and the data signals are also conducted through the secondary winding via the first capacitor and through the first conductor and the second conductor.

18. The method of claim 17 wherein the first output terminal of the power supply is directly connected to the first end of the secondary winding.

19. The method of claim 17 wherein the second output terminal of the power supply is directly connected to the second conductor.

20. The method of claim 17 further comprising conducting the data signals and the DC power through a common mode choke (CMC) having a first winding coupled between the first conductor and the first end of the secondary winding of the transformer, and having a second winding coupled between the second conductor and the first AC-coupling capacitor.

21. A Power over Data Lines (PoDL) circuit for connection to a first conductor and a second conductor comprising:
- a transceiver having a first terminal and a second terminal, the transceiver for transmitting data signals over the first conductor and the second conductor and receiving data signals from the first conductor and the second conductor;
- an isolation transformer having a primary winding and a secondary winding, the first terminal and the second terminal of the transceiver being coupled across the primary winding;
- the secondary winding of the transformer having a first end coupled to the first conductor, and having a second end configured to be coupled to a first output terminal of a DC power supply;
- the second conductor being configured to be coupled to a second output terminal of the power supply; and
- an AC-coupling first capacitor coupled between a second end of the secondary winding of the transformer and the second conductor for coupling data signals across the secondary winding,
- wherein DC power is conducted through the secondary winding and through the first conductor and the second conductor, and the data signals are also conducted through the secondary winding, via the first capacitor, and through the first conductor and the second conductor.

\* \* \* \* \*